(12) United States Patent
Romerein et al.

(10) Patent No.: US 7,918,430 B2
(45) Date of Patent: Apr. 5, 2011

(54) METHODS AND APPARATUS FOR MOUNTING DEVICES

(75) Inventors: Robert L. Romerein, Pontypool (CA); Brian J. Shapson, Millstone Township, NJ (US); Jay F. Shapson, Millstone, NJ (US)

(73) Assignee: Extreme Broadband Engineering, LLC, Millstone Township, NJ (US)

( * ) Notice: Subject to any disclaimer, the term of this patent is extended or adjusted under 35 U.S.C. 154(b) by 0 days.

(21) Appl. No.: 12/456,094

(22) Filed: Jun. 11, 2009

(65) Prior Publication Data

US 2009/0314907 A1    Dec. 24, 2009

Related U.S. Application Data

(60) Provisional application No. 61/132,852, filed on Jun. 23, 2008.

(51) Int. Cl.
*F16M 13/00* (2006.01)

(52) U.S. Cl. .................. 248/558; 248/645; 248/223.41; 379/450; 361/657

(58) Field of Classification Search .................. 248/558, 248/645, 674, 220.21, 222.51, 223.41; 379/413.04, 379/450; 361/644, 657, 679.37
See application file for complete search history.

(56) References Cited

U.S. PATENT DOCUMENTS

| | | | | |
|---|---|---|---|---|
| 4,466,595 | A * | 8/1984 | O'Connor | 248/558 |
| 4,650,425 | A * | 3/1987 | McGarry | 434/219 |
| 4,932,051 | A | 6/1990 | Karan et al. | 379/399 |
| 5,154,391 | A * | 10/1992 | Hegarty | 248/454 |
| 5,327,114 | A * | 7/1994 | Straate et al. | 340/286.06 |
| 5,394,466 | A * | 2/1995 | Schneider et al. | 379/413.03 |
| 5,560,572 | A * | 10/1996 | Osborn et al. | 248/27.3 |
| 5,600,717 | A * | 2/1997 | Schneider et al. | 379/413.03 |
| 5,978,472 | A * | 11/1999 | Tuvy et al. | 379/413.02 |
| 5,988,619 | A * | 11/1999 | Wark et al. | 269/305 |
| 6,011,831 | A * | 1/2000 | Nieves et al. | 379/21 |
| 6,120,000 | A * | 9/2000 | Aeschbach et al. | 248/694 |
| 6,224,178 | B1 * | 5/2001 | Cirocco | 312/334.46 |
| 6,788,786 | B1 * | 9/2004 | Kessler et al. | 379/413.04 |
| 7,090,174 | B2 | 8/2006 | Korczak et al. | 248/61 |
| 7,257,223 | B2 * | 8/2007 | Sajadi et al. | 379/413.04 |
| 7,273,203 | B2 * | 9/2007 | Carnevali | 248/553 |
| 2003/0072138 | A1 * | 4/2003 | Greenside et al. | 361/752 |
| 2006/0249633 | A1 * | 11/2006 | Korczak et al. | 248/62 |
| 2006/0262521 | A1 * | 11/2006 | Piepgras et al. | 362/149 |
| 2007/0160195 | A1 | 7/2007 | Vo et al. | 379/413.04 |
| 2009/0173855 | A1 * | 7/2009 | Worrall | 248/222.12 |

* cited by examiner

*Primary Examiner* — Terell McKinnon
*Assistant Examiner* — Bradley H Duckworth
(74) *Attorney, Agent, or Firm* — Watov & Kipnes, P.C.; Kenneth Watov

(57) ABSTRACT

A device mounting apparatus includes a mounting base portion having a plurality of opposing pairs of rails. The mounting base portion is adapted for mounting on a support structure. The apparatus further includes a mounting tab affixed to a device for snap in mounting between a pair of rails, whereby the device is captively retained on the mounting base portion, and can be disengaged therefrom by snapping the mounting tabs out of the associated pairs of rails.

21 Claims, 13 Drawing Sheets

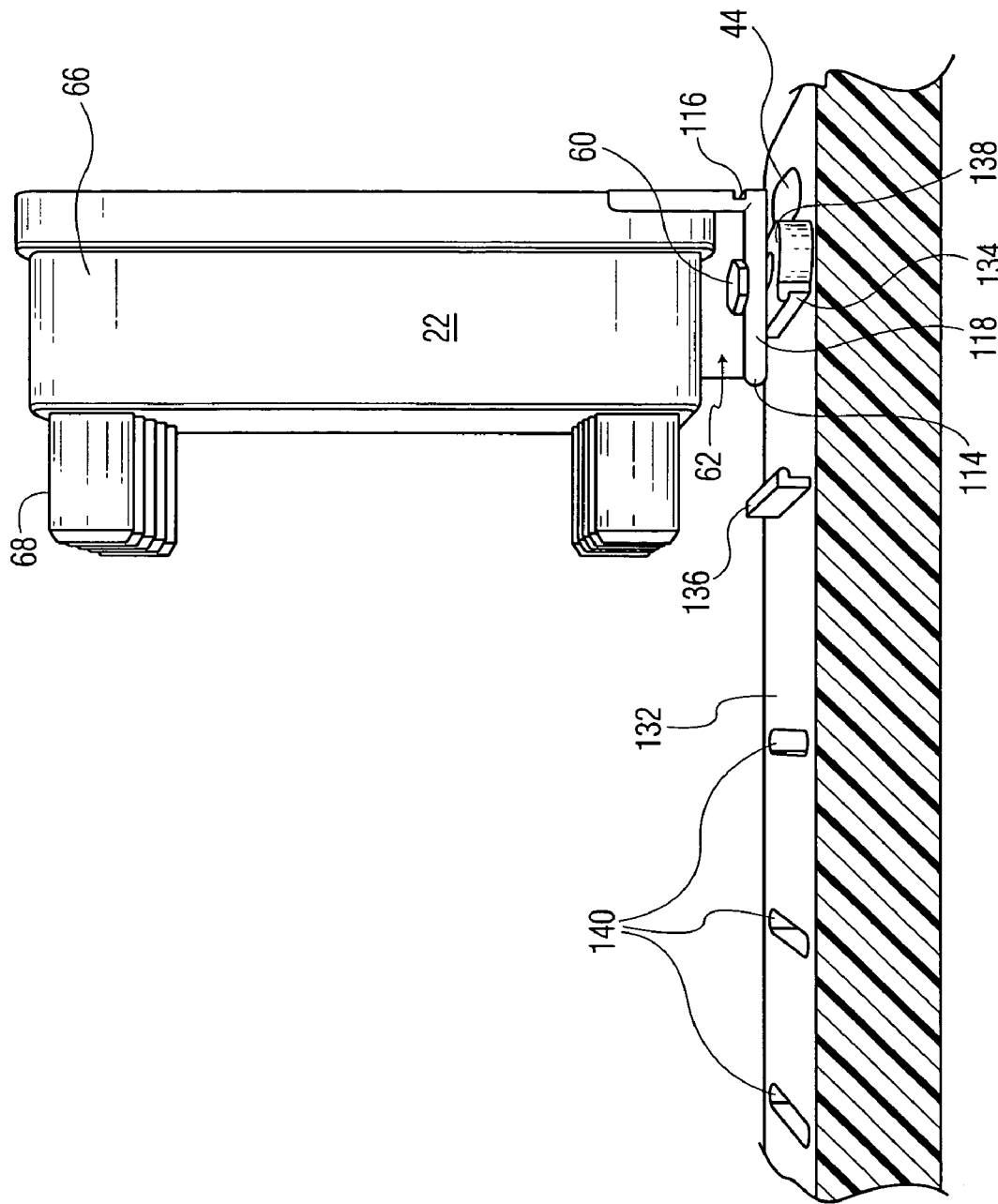

METHODS AND APPARATUS FOR MOUNTING DEVICES

RELATED APPLICATION

This application claims the benefit of U.S. Provisional Application No. 61/132,852, filed Jun. 23, 2008, the content of which is incorporated herein by reference to the extent that it does not conflict herewith.

FIELD OF THE INVENTION

The present invention is generally related to apparatuses for mounting devices and is more particularly related to demarcation enclosures.

BACKGROUND OF THE INVENTION

Present known demarcation enclosures require the use of screws and/or other types of individual fasteners for mounting and securing devices associated with communication technology in the enclosures. There is a need in the art to eliminate the fasteners, and simplify and provide rapid mounting of devices into demarcation enclosures.

SUMMARY OF THE INVENTION

The present invention is directed generally to methods and apparatus for mounting devices. The apparatus of the present invention, preferably a demarcation enclosure, is configured to provide a user with an option to conveniently mount the devices with a quick snap-in feature, thereby avoiding the need for tools and greatly reducing required mounting time. The apparatus of the present invention greatly enhances and streamlines the process of mounting and installing devices, while remaining cost effective and simple to fabricate. In addition, the apparatus of the present invention is designed to provide great flexibility in accommodating various devices, such as communication devices, for example, and facilitating convenient positioning and mounting of the devices.

In one aspect of the present invention, there is provided an apparatus for mounting devices, comprising:

a mounting base portion;

a mounting tab affixed to a device for mounting on said mounting base portion; and means operatively associated with the mounting base portion for captively providing snap-in retention, and snap-out removal of said mounting tab of an associated device thereon.

In a further aspect of the present invention, there is provided an apparatus for mounting devices, comprising:

a mounting base portion being adapted for mounting on a support structure; and at least one pair of opposing first and second mounting rails disposed on the mounting base portion, the first and second mounting rails being configured for operatively cooperating with one another to securely retain the tab portions of a device therebetween.

In another aspect of the present invention, there is provided an apparatus for mounting devices, comprising:

a mounting base portion; and at least one flush mounting slot disposed in said mounting base portion, said flush mounting slot being configured for receiving a threaded fastener to secure a device on said mounting base portion.

In a particular embodiment of the invention, the apparatus of the present invention includes a mounting base portion, and a plurality of elongated rails and slots disposed on the mounting base portion, wherein the rails and slots are configured to receive and rigidly secure mounting tabs of various devices between the rails and slots, while permitting easy removal of the mounted devices. In this manner, the present invention provides enhanced cable management within the associated apparatus.

In another embodiment of the invention, gasket means are provided along a sidewall of a demarcation enclosure for permitting a portion of a coaxial cable to be pushed through a vertical slit from the edge of the gasket, down through a slotway covered by the gasket, whereby the gasket has X-shaped slits across the central portion for permitting entry of the cable portion into the hole from the upper portion of the gasket.

BRIEF DESCRIPTION OF THE DRAWINGS

Various embodiments of the invention are described in greater detail below with reference to the drawings, in which like terms are identified by the same reference designation, wherein:

FIG. 14 is a partial sectional and cutaway side perspective view of a floor of the demarcation enclosure apparatus of FIG.

Figure 1:
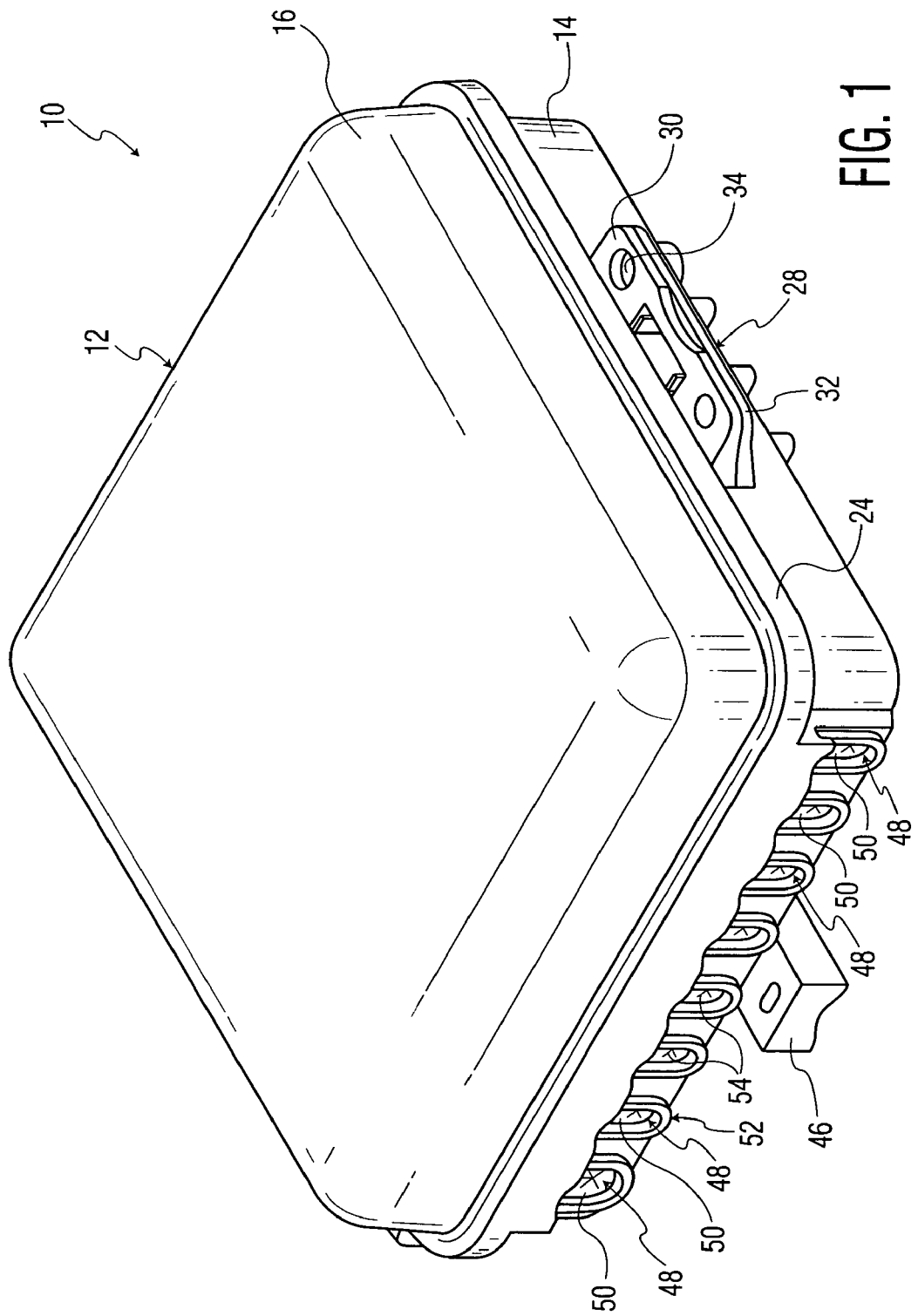
FIG. 1 is a perspective view looking toward the top of a demarcation enclosure apparatus in a closed state for one embodiment of the present invention.

13 with a communication device mounted thereon in accordance with the present invention.

DETAILED DESCRIPTION OF THE INVENTION

The present invention is directed generally to methods and apparatus for mounting devices. The apparatus of the present invention, preferably in the form of a demarcation enclosure, is configured to provide a user with an option to conveniently mount the devices with a quick snap-in feature, thereby avoiding the need for tools and greatly reducing required mounting time. The apparatus of the present invention greatly enhances and streamlines the process of mounting and installing devices, while remaining cost effective and simple to fabricate. In addition, the apparatus of the present invention is designed to provide great flexibility in accommodating various devices, such as communication devices, for example, and facilitating convenient positioning and mounting of the devices. Although the present invention is described generally in context of demarcation enclosures, it will be understood that the present invention is not limited and can extend to any devices or apparatuses or applications for mounting devices.

It should be noted that there are a variety of demarcation requirements in terms of the combination of devices required to configure the service to the needs of the subscriber. Therefore, the mounting platform must offer a generalized pattern on which to mount various devices with different shapes and numbers of ports. Typically, all known demarcation enclosures offer a grid of bosses to facilitate mounting screws. The present invention, in one embodiment, extends the flexibilities of the grid by providing successive parallel slots for mounting screws instead of individual bosses to allow the mounting of devices at any point along the axis of the slots. In another embodiment of the invention, a mounting deck with pairs or sets of opposing rails are another means for providing this freedom of snap-in mounting of devices with mounting tabs at a desired position along the axis of the rails without the need for fasteners such as screws.

In one embodiment of the present invention, there is provided an apparatus, such as a demarcation enclosure, including a mounting base portion adapted for mounting on a support structure, and means operatively associated with the mounting base portion for captively retaining a portion of a device thereon. The retaining means are configured for snap engagement or disengagement with tab portions of the device.

In a particular embodiment of the invention, the apparatus of the present invention includes a mounting base portion, and a plurality of elongated rails and slots disposed on the mounting base portion, wherein the rails and slots are configured to receive and rigidly secure mounting tabs of various devices between the rails and slots, while permitting easy removal of the mounted devices. In this manner, the present invention provides enhanced cable management within the associated apparatus.

It should be noted that the demarcation point of a utility service such as cable television is not always characterized by an enclosure. Occasionally, the signal distribution devices are exposed, being mounted to a sheet of substrate such as plywood, for example. In this case, the back or mounting base portion of the present invention that is designed to snap into the enclosure can also be mounted by itself to a sheet of plywood or wall to hold the devices, such as communication devices, in a convenient and orderly manner without the need for individual fasteners to secure such devices.

As used herein, the term "communication device" refers to a broad class of devices, including but not limited to devices having at least one input port and/or at least one output port for use in telecommunication distribution networks such as, for example, coaxial-based cable television distribution networks. Some examples of these communication devices include amplifiers, signal splitters, combiners, filters, taps, and the like. However, the present invention can be used for mounting devices other than communication devices.

Figure 2:
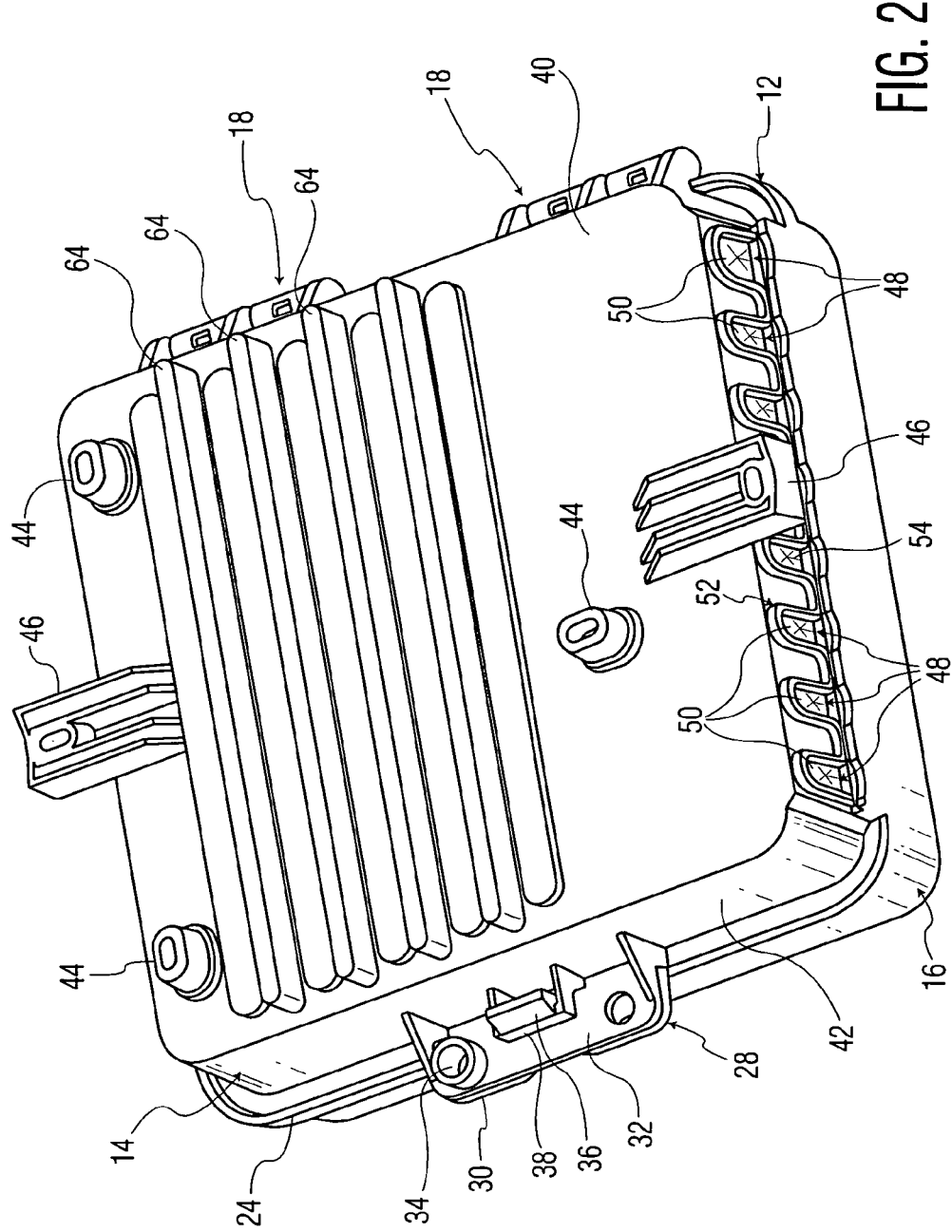
FIG. 2 is a perspective view looking toward the bottom of the demarcation enclosure apparatus in accordance with the present invention.

Referring to FIGS. 1 and 2, a demarcation enclosure apparatus identified by reference numeral 10 is shown for one embodiment of the present invention. Although the present invention is shown and described in context of a demarcation enclosure, it is understood that the present invention is not limited to this application. The present invention can be used for any application where it is desirable to securely mount devices or objects on a mounting base or plate disposed within a container or enclosure in an efficient and convenient manner.

The demarcation enclosure apparatus 10 is generally configured for providing a connection or demarcation point between a telecommunication network at large (e.g., telephone and coaxial-based systems) and a destination or premise wiring (e.g., subscriber's home). The demarcation enclosure apparatus 10 is designed to hold signal distribution devices or communication devices at the demarcation point where the communication utility enters a building or premise, and provides protection for the devices. The demarcation enclosure apparatus 10 further provides a secure location for terminating cables such as coaxial cables and mounting communication devices such as cable splitters, ground blocks and other broadband devices. The size of the demarcation enclosure apparatus 10 can vary as needed to accommodate various numbers and size of demarcation devices or communication devices.

The demarcation enclosure apparatus (referred herein simply as "apparatus") includes a housing 12 having a mounting base portion 14 and a movable cover 16 attached to the mounting base portion 14 via a hinge assembly 18. The combination of the mounting base portion 14 and the movable cover 16 defines an interior cavity or compartment 20 for holding or accommodating one or more communication devices 22 (as shown best in FIG. 3). The housing 12 of the apparatus 10 can be fabricated through conventional manufacturing methods including casting, pressing, extruding, and the like, and constructed from suitable rigid materials including plastic polymers such as thermoplastics, thermosets, and the like. Preferably the rigid material is a rugged, impact resistant thermoplastic resin. The hinge assembly 18 is adapted to allow the cover 16 to move to an open position or be removed, if needed, to access the interior of the apparatus 10 as will be described hereinafter.

The cover 16 includes an overhang 24 extending along the periphery thereof, which in the closed position contacts and overlaps a top edge portion 26 of the mounting base portion 14 for a tight seal therebetween. The apparatus 10 further includes a latch assembly 28 comprising upper and lower latch portions 30 and 32, respectively, which cooperate to secure the cover 16 in a locked state. As best shown in FIG. 2, the upper latch portion 30 includes a latch 36, which engages a keeper 38 located on the lower latch portion 32 for releasable securement, when the cover 16 is in the closed position. The latch assembly 28 can further include a hole or through-bore 34 for receiving a locking device (e.g., padlock and security/identification tag) to further secure the interior compartment 20 from unauthorized access or tampering.

The mounting base portion 14 of the housing 12 includes a floor or base 40 (see FIG. 3) and a sidewall 42 extending substantially along the periphery of the floor 40. The mounting base portion 14 includes one or more wall mount bosses 44 extending through the floor 40 for facilitating mounting of the apparatus 10 with a suitable fastener to a support structure such as a wall, and a pole mount bracket assembly 46 attached to the floor 40 for facilitating mounting of the apparatus 10 with a suitable fastener to a support structure such as a pole. In this manner, the apparatus 10 can be mounted in a vertical upright position or a horizontal flat position depending on the needs of the application and the existing support structure.

The apparatus 10 further includes a plurality of cable apertures or ports 48 disposed in the mounting base portion 14 of the housing 12 for organizing wires or cables 56 (see FIG. 5) in a side-by-side or juxtaposed arrangement. The cable apertures 48 are arranged adjacent to one another in a spaced apart manner, and each include an elastomeric or grommet-forming web 50 extending thereacross. In the present embodiment, the webs 50 are connected to one another to form a single, unitary aperture gasket 52, which is securely mounted to the mounting base portion 14 of the housing 12 as will be described hereinafter. The grommet-forming webs 50 each include a plurality of slits 54 intersecting at a central point thereof. The webs 50 permit portions of a wire or cable 56 (see FIG. 5) such as a coaxial cable to be inserted into the cable apertures 48 from the top of the gasket 52, as will be described hereinafter. In this manner, the inserted cable 56 can be connected to a communication device 22 (see FIG. 3) mounted within the apparatus 10.

Figure 12:
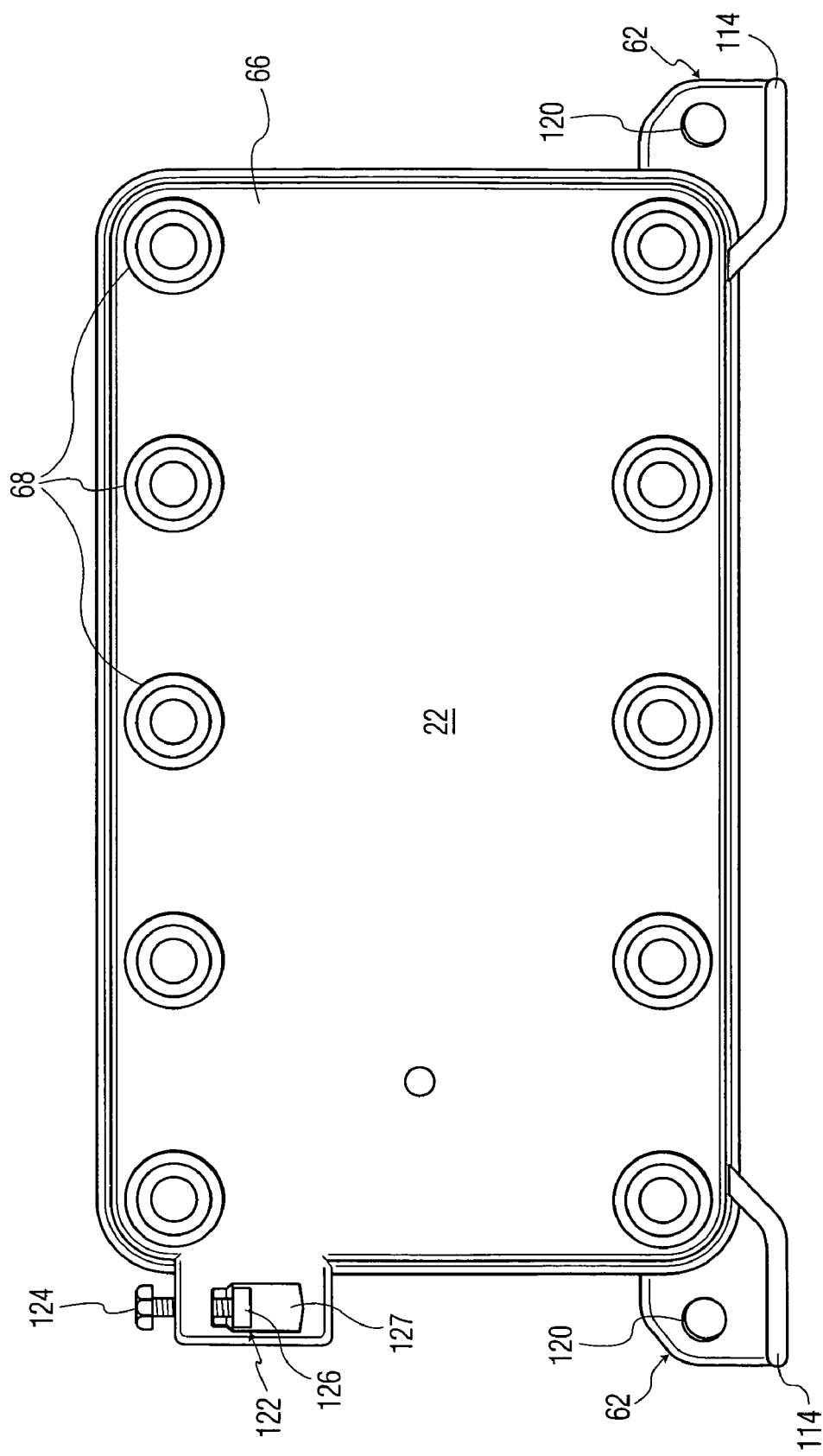
FIG. 12 is a front elevational view of the communication device showing a top view of the mounting bracket of FIG. 11, in accordance with the present invention.

Referring to FIG. 12, the communication device 22 is a drop-end cable tap for illustrative purposes, and includes a casing 66, a plurality of connector ports 68, and a pair of mounting brackets or tabs 62. The mounting brackets 62 can include mounting holes 120 for receiving threaded fasteners such as self-tapping screws, for example, to accommodate conventional mounting techniques. The communication device 22 further includes a ground connection flange 122 having a screw 124 and a movable piston 126 for receiving a grounding wire (not shown) within an opening 127 to ground the housing of the communication device 22. The screw 124 is moved inward to clamp the wire between the piston 126 and the bottom of the opening 127. It is understood that the communication device 22 is not limited to this device and configuration, and may include others as known to those of ordinary skill in the art.

Figure 3:
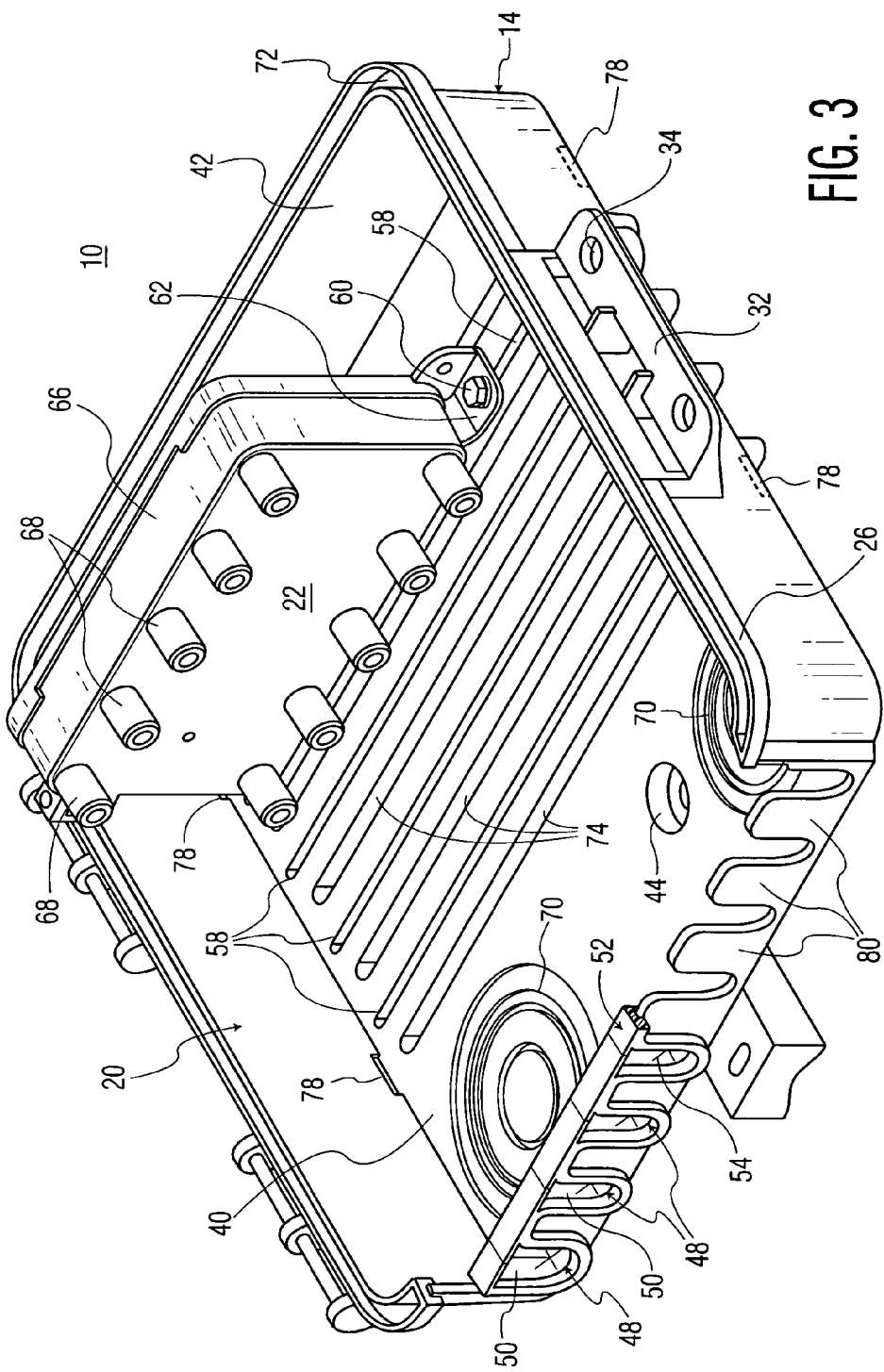
FIG. 3 is a perspective view looking toward the interior bottom portion of the demarcation enclosure apparatus in an open state with a communication device mounted therein via a screw fastener in accordance with the present invention.

Referring to FIG. 3, the apparatus 10 is shown with the cover 16 removed for a detailed illustration of the interior compartment 20. The communication device 22 includes a housing or casing 66, one or more connector ports 68 serving as input(s) and output(s), and a pair of mounting brackets or tabs 62, in this example. The floor 40 of the mounting base portion 14 includes one or more elongated flush mounting slots 58 disposed therein. The flush mounting slots 58 permit the optional use of conventional mounting techniques via threaded fasteners. The flush mounting slots 58 provide enhance flexibility in accommodating communication devices of various sizes, shapes and configurations including the configurations of the mounting brackets, for example, and offer greater ease in positioning multiple communication devices within the apparatus 10.

The flush mounting slots 58 are configured to receive a threaded fastener 60 such as a self-tapping screw. As shown in FIG. 3, the threaded fastener 60 extends through each mounting bracket or tab 62 of the device 66 to securely mount the communication device 22 to the floor 40. The threaded fasteners 60 securely engage the corresponding flush mounting slots 58 and screw securely into the floor 40. To prevent the threaded fasteners 60 from penetrating through the floor 40, the mounting base portion 14 includes solid elevated rail portions 64 extending from the bottom exterior side of the mounting base portion 14 (as shown best in FIG. 2) immediately below the position of flush mounting slots 58. The fasteners 60 securely screw into the elevated rail portions 64.

Figure 6:
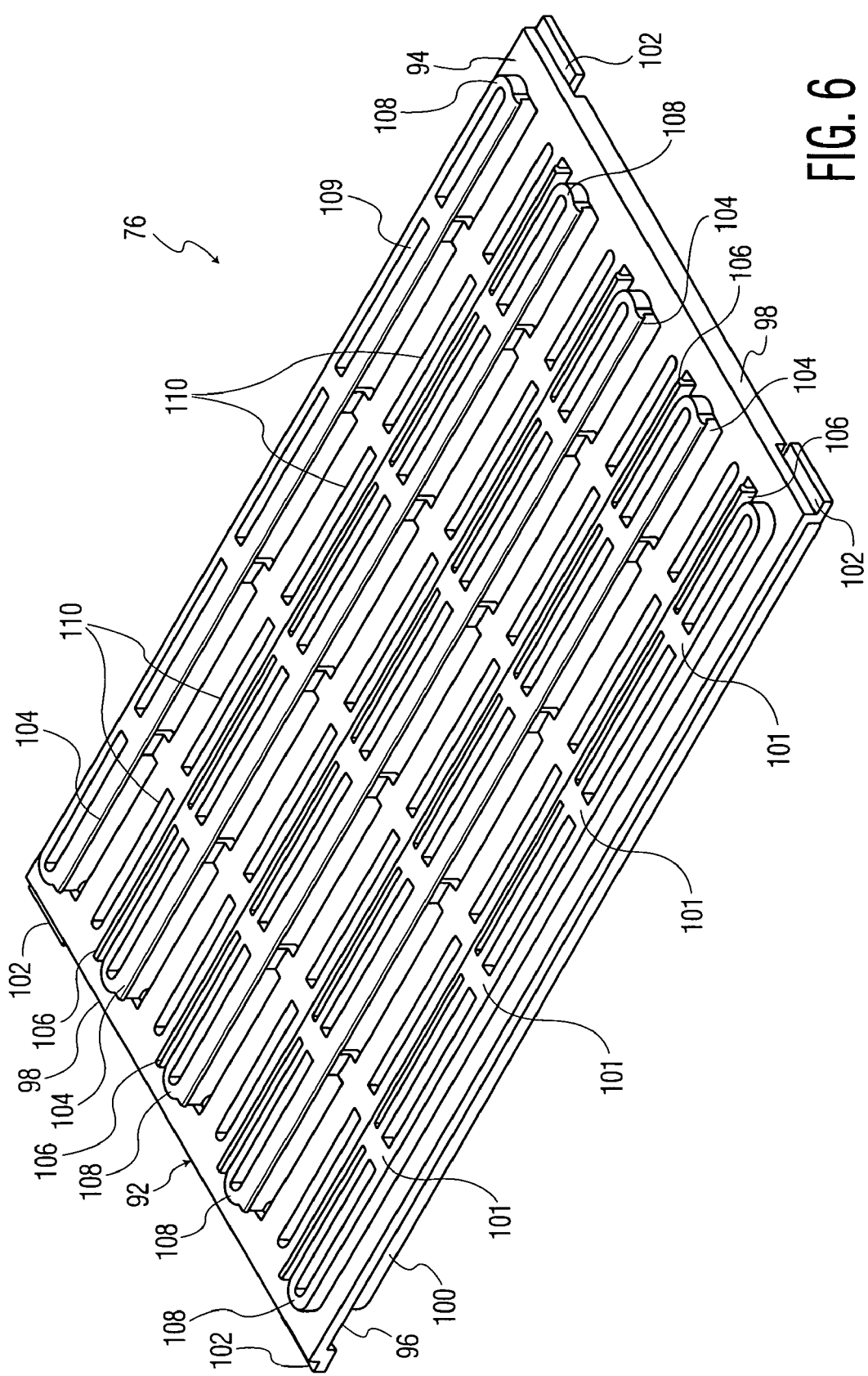
FIG. 6 is a perspective view of a mounting deck for one embodiment of the present invention.

The apparatus 10 includes a pair of cable knockouts 70, each having concentric circle knockouts for selectively sizing the required hole, to accommodate the attachment of different sizes of cables as required, and a gasket well 72 for receiving a gasket (not shown) which contacts the inside surface of the closed cover 16 for ensuring a weather-tight seal of the interior compartment 20. The apparatus 10 further includes one or more extension wells 74, and one or more opposing pairs of sidewall notches 78 disposed on the sidewall 42 proximate to the floor 40, each of which are configured for properly positioning and seating a snap fastener assembly 76 (as shown in FIG. 6) on the floor 40 as will be described hereinafter.

As shown in FIG. 3, the mounting base portion 14 of the housing 12 includes a plurality of finger projections 80 defining therebetween the cable apertures 48. The aperture gasket 52 (shown partially cutaway) is configured for tight seating with the finger projections 80, with each of the plurality of the grommet-forming webs 50 extending across a corresponding cable aperture 48. The aperture gasket 52 includes a top surface 82 configured to engage the overhang 24 (see FIG. 1) of the cover 16 in the closed position, thereby maintaining the interior compartment 20 in a weather-tight seal to prevent passage of moisture and insects.

The aperture gasket 52 is composed of a resilient, elastomeric material such as, for example, solid foam such as polystyrene, polyurethane and extruded polystyrene foam, natural and synthetic rubber, polyisoprene, butyl rubber, polybutadiene, nitrile rubber, chloroprene rubber, ethylene propylene rubber, ethylene propylene diene rubber, epichlorohydrin rubber, polyacrylic rubber, silicone rubber, fluorosilicone rubber, fluoroelastomers, perfluoroelastomers, polyether block amides, chlorosulfonated polyethylene, ethylene-vinyl acetate, thermoplastic elastomers, thermoplastic polyurethane, thermoplastic olefins, polysulfide rubber and the like. Preferably, the aperture gasket 52 is molded in one-piece, and composed of a durable ultraviolet resistant foam material.

Figure 4A:
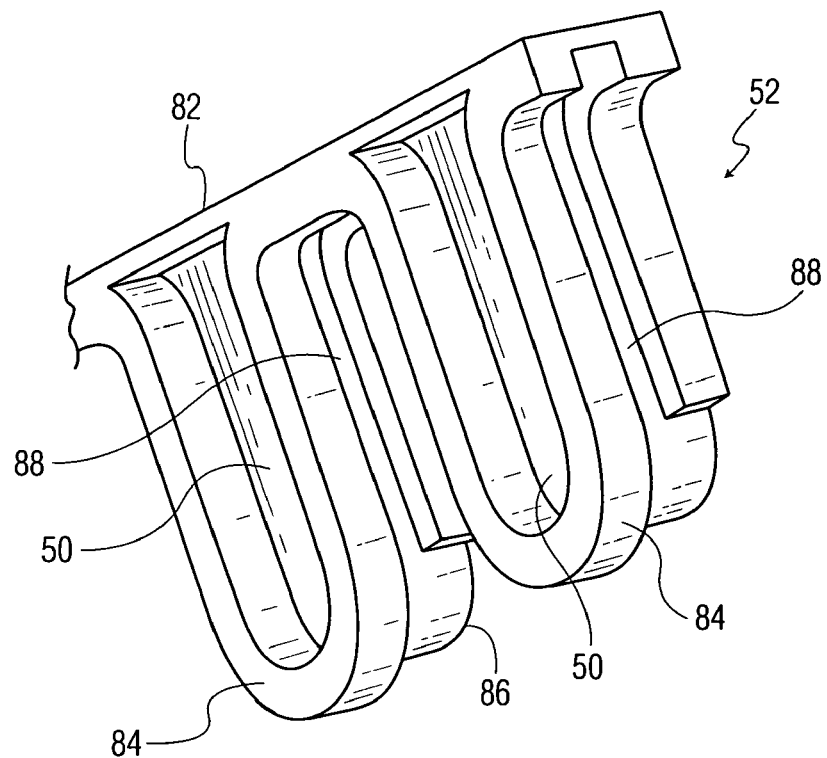
FIG. 4A is a partial front perspective view of an aperture gasket comprising a plurality of grommet-forming webs for one embodiment of the present invention.
Figure 4B:
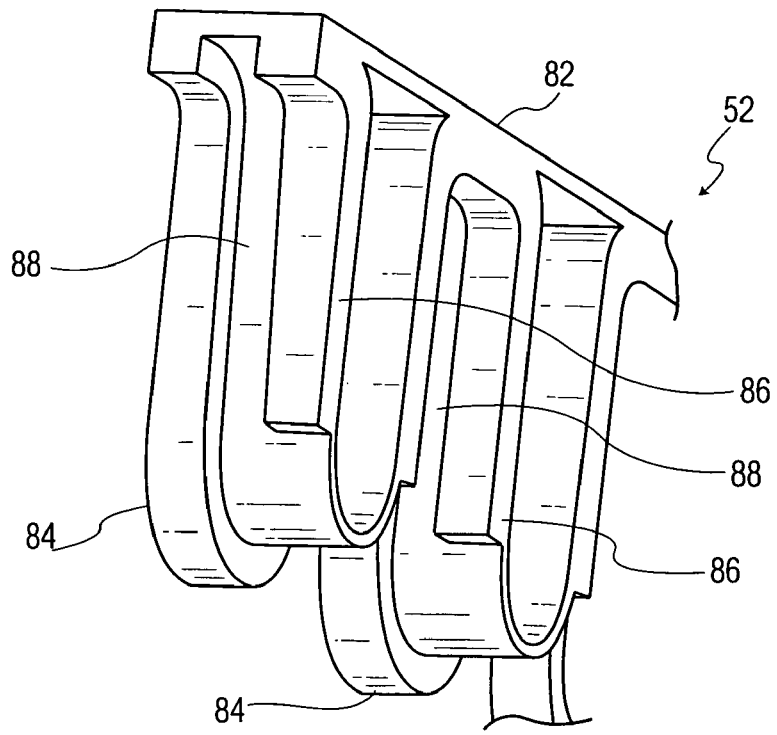
FIG. 4B is a partial rear perspective view of the aperture gasket in accordance with the present invention.

Referring to FIGS. 4A and 4B, the aperture gasket 52 includes a top surface 82, a plurality of spaced apart downwardly extending exterior flange portions 84, each surrounding substantially along the periphery of an associated grommet-forming web 50, and interior flange portions 86 disposed on the opposing sides of the exterior flange portions 84. Finger receiving slots 88 are located between the exterior and interior flange portions 84 and 86, respectively, as shown. The finger receiving slots 88 are configured to receive the finger projections 80 of the mounting base portion 14 to facilitate secure seating of the aperture gasket 52 thereon. In this manner, the exterior flange portion 84 of the aperture gasket 52 is disposed on the exterior side of the mounting base portion 14, and the interior flange portion 86 of the aperture gasket 52 is disposed on the interior side of the mounting base portion 14 to ensure a tight frictional fit therebetween.

Figure 5:
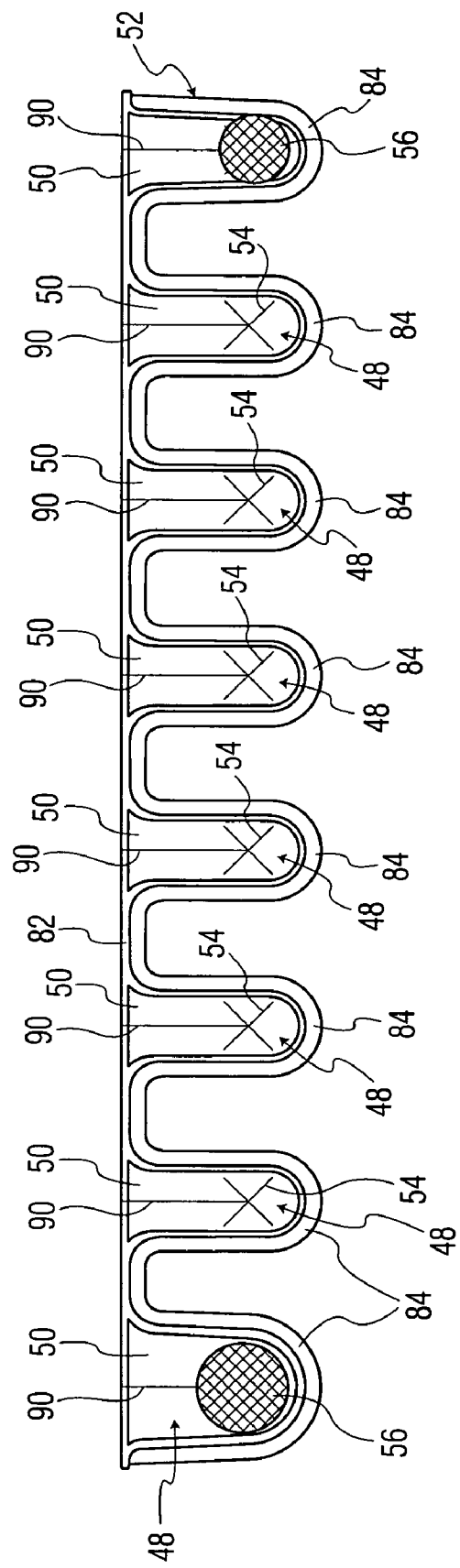
FIG. 5 is a front elevational view of the aperture gasket with cables or connection wires passed through two of the grommet-forming webs in accordance with the present invention.

Referring to FIG. 5, the grommet-forming web 50 includes a center slit 90 extending from the top surface 82 to the slits 54, for permitting a portion of a coaxial cable body below a connector at the end of the cable to be pushed from the top of the gasket 52 through the slit 90 into the cable aperture 48 via slits 54. With the cover 16 in the open position, the center slit 90 allows a cable 56, such as a coaxial cable, to be slipped into position into the cable aperture 48, as described. The corresponding web 50 forms a grommet seal around the cable 56 to provide a weather-tight seal therebetween, thereby preventing passage of moisture and insects into the interior compartment 20. The finger projections 80 and the aperture gasket 52 can be modified to vary the diametric size of the cable apertures 48 as necessary to accommodate different size wires or cables 56 and ensure a weather-tight seal. The cable apertures 48 can be suitably sized and configured to accommodate therein two or more cables 56 in a stacked arrangement.

Figure 7:
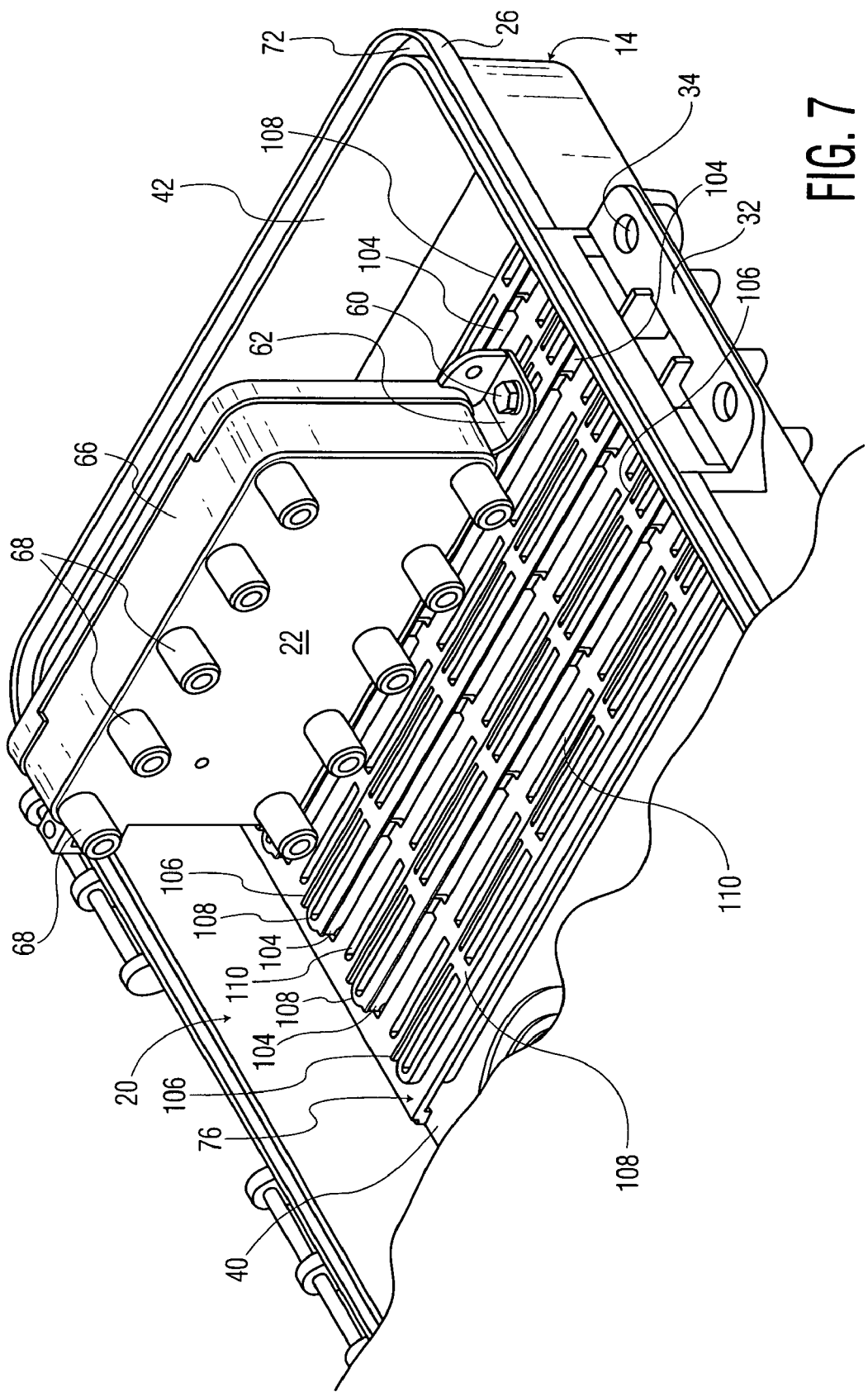
FIG. 7 is a partial perspective view of the demarcation enclosure apparatus with the mounting deck installed therein in accordance with the present invention.

Referring to FIGS. 6 and 7, a snap mount assembly 76, for one embodiment of the invention, is configured for securely mounting a communication device 22 to the mounting base portion 14 without the use of tools or other fastening means such as threaded fasteners. The mount assembly 76 includes a mounting deck 92 having top and bottom surfaces 94 and 96, respectively, and an edge portion 98. The mounting deck 92 includes one or more elongated extensions 100 projecting from the bottom surface 96, and two pairs of opposing tabs 102 projecting away from the edge portion 98 of opposing ends thereof on opposing sides (also see FIG. 8). The mounting deck 92 can be fixedly attached to the floor 40 of the mounting base portion 14. The extensions 100 and the tabs 102 of the mounting deck 92 insert into the extension wells 74 (see FIG. 3), and into the sidewall notches 78 (see FIG. 3), respectively, for secure retainment of the mounting deck 92 to the floor 40. In this manner, the top surface 94 of the mounting deck 92 fits flush to the floor 40 of the mounting base portion 14 (as shown best in FIG. 7).

As shown in FIG. 6, the mounting deck 92 further includes four pairs of a first mounting rail 104 and an opposing mounting rail 106 disposed on the top surface 94 thereof. Each pair of first and second mounting rails 104 and 106, respectively, is adapted to cooperate with one another to captively retain a mounting bracket or tab 62 of a communication device 22 in a frictional engagement therebetween (as shown best in FIG. 8). In this manner, the mounting arms 104 and 106 functions as a snap fastener.

Optionally, the mounting deck 82 further includes a plurality of raised mounting bosses 108 defining raised mounting slots 109, disposed proximate to the mounting rails 104 and 106, respectively, on the top surface 94 thereof. As shown in FIG. 7, the raised mounting slots 109 are functionally similar to the flush mounting slots 58 of the mounting base portion 14 (see FIG. 3), and are configured to allow the optional use of conventional mounting techniques such as threaded fasteners. Similarly, the raised mounting slots 109 are configured to receive a threaded fastener 60 such as a self-tapping screw. The threaded fastener 60 extends through each mounting bracket or tab 62 to securely mount the communication device 22 to the mounting deck 92. Also note that strengthening ribs 101 are provided as shown throughout the mounting deck 92.

Referring to FIGS. 8, 9, 10, and 11, the first and second mounting rails 104 and 106, respectively, include inwardly directed protrusions 112 and 113, respectively, extending from the distal ends thereof. As discussed previously, the first and second mounting rails 104 and 106, respectively, are configured for captively retaining the mounting bracket 62 of the communication device 22 in a self-contained manner without the use of tools or other fastening means such as threaded fasteners.

Figure 9:
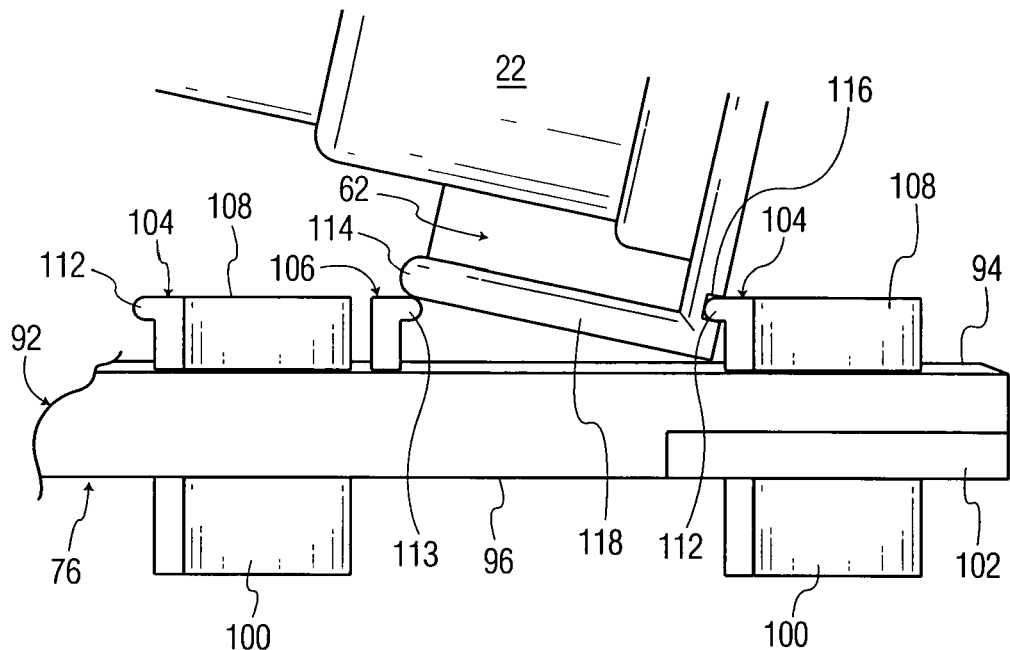
FIG. 9 is an enlarged elevational view of a mounting bracket or tab of a communication device engaging with or disengaging from first and second mounting rails on a simplified view of the mounting deck in accordance with the present invention.
Figure 10:
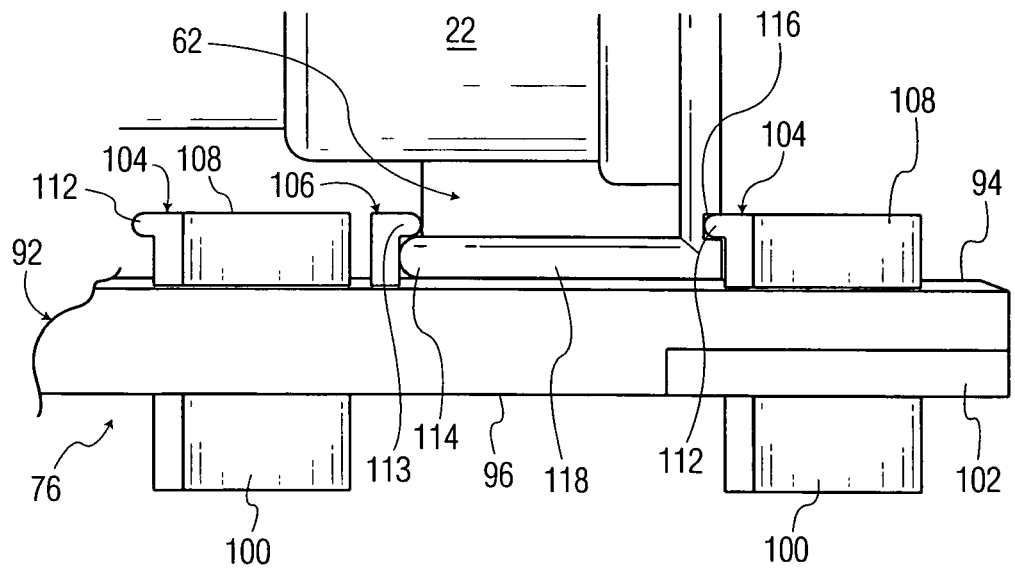
FIG. 10 is an enlarged elevational view of the mounting bracket shown in FIG. 9 captively retained between the first and second mounting rails in accordance with the present invention.
Figure 11:
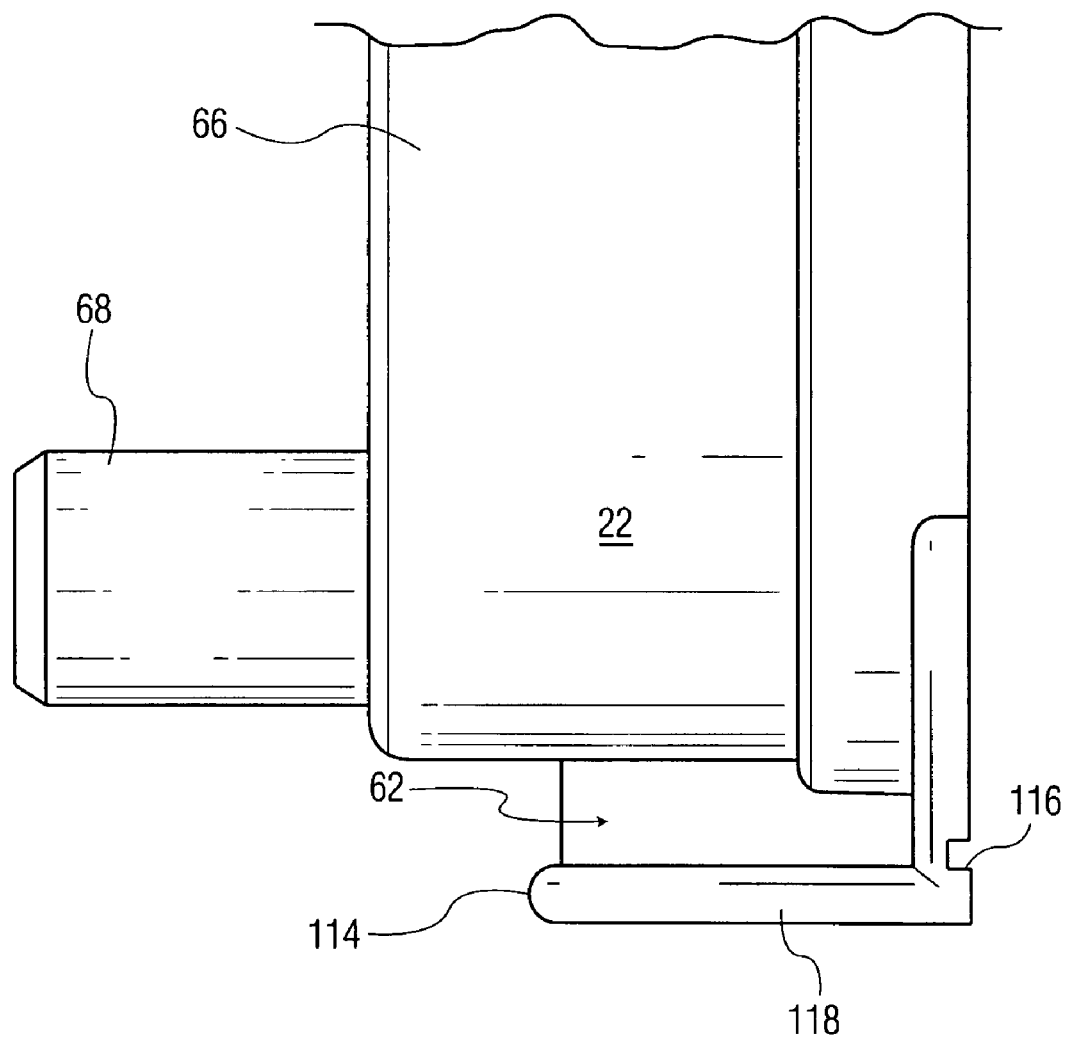
FIG. 11 is an enlarged elevational view of a mounting bracket in accordance with the present invention.

As shown specifically in FIGS. 9, 10, and 11, the mounting bracket 62 includes a base 118 having a forward extending lip 114, and a groove 116 disposed on the opposing side thereof. In the present embodiment of the invention, the first mounting rail 104 is rigid and unbending, and the second mounting rail 106 is resilient and more flexible than the first mounting rail 104. This configuration provides a secure captive retainment with the communication device 22 mounted, while allowing the communication device 22 to be snapped in place or effortlessly removed when desired. It is noted that when the mounting deck 92 is oriented vertically, the rigid first mounting rail 104 is positioned spatially above the flexible second mounting rail 106.

To mount a communication device 22 into the apparatus 10, the mounting bracket 62 is positioned with the rail protrusion 112 of the first mounting bracket 104 seated within the groove 116 and the lip 114 contacting the rail protrusion 113 of the second mounting rail 106 as shown in FIG. 9. As pressure is applied from the lip 114 onto the rail protrusion 113 of the second mounting rail 106, the second mounting rail 106 bends back and gives way to the mounting bracket 62 until the base 118 contacts the top surface 94 of the mounting deck 92. The second mounting rail 106 snaps back to the rest position with the rail protrusions 112 and 113 of the first and second mounting rails 104 and 106, respectively, captively retaining the mounting bracket 62 therebetween, and the rail protrusion 113 of rail 106 overlying the lip 114 of the bracket 62 (see FIG. 10).

To dismount the communication device 22 from the apparatus 10, the lip 114 of the mounting bracket 62 is pulled away from the mounting deck 92. This action causes the second mounting rail 106 to bend back and give way until the lip 114 clears the second mounting rail 106. Once cleared, the communication device 22 can be removed from the apparatus 10.

Figure 8:
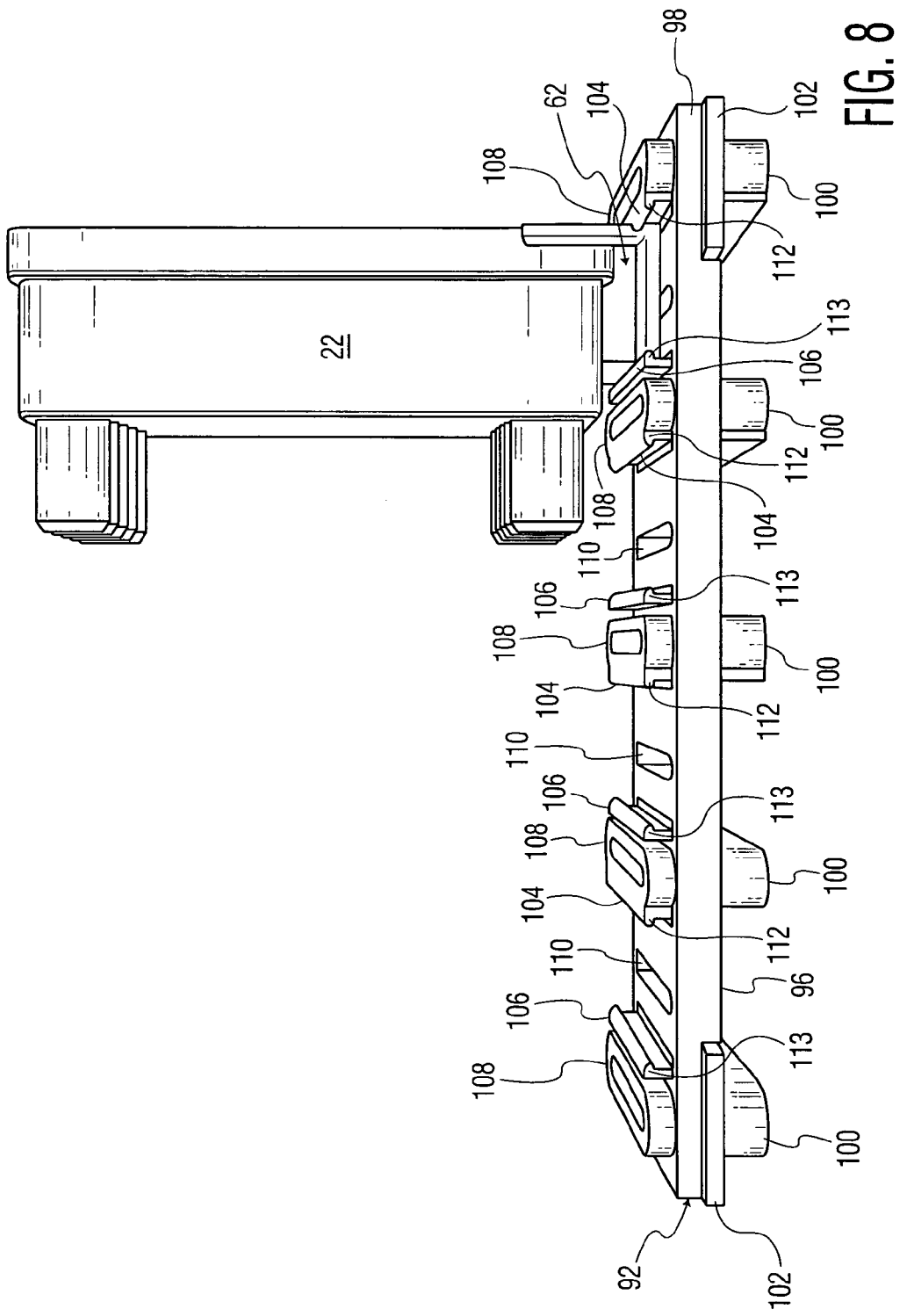
FIG. 8 is a simplified pictorial view of from a side of the mounting deck of FIG. 6 with a communication device mounted thereon in accordance with the present invention.

As shown in FIGS. 7 and 8, the mounting deck 92 can further include flush mounting slots 110 between the first and second mounting rails 104 and 106, respectively, for receiving a threaded fastener 60 to optionally rigidly secure the mounting bracket 62 captively retained between the first and second mounting rails 104 and 106, respectively.

Figure 13:
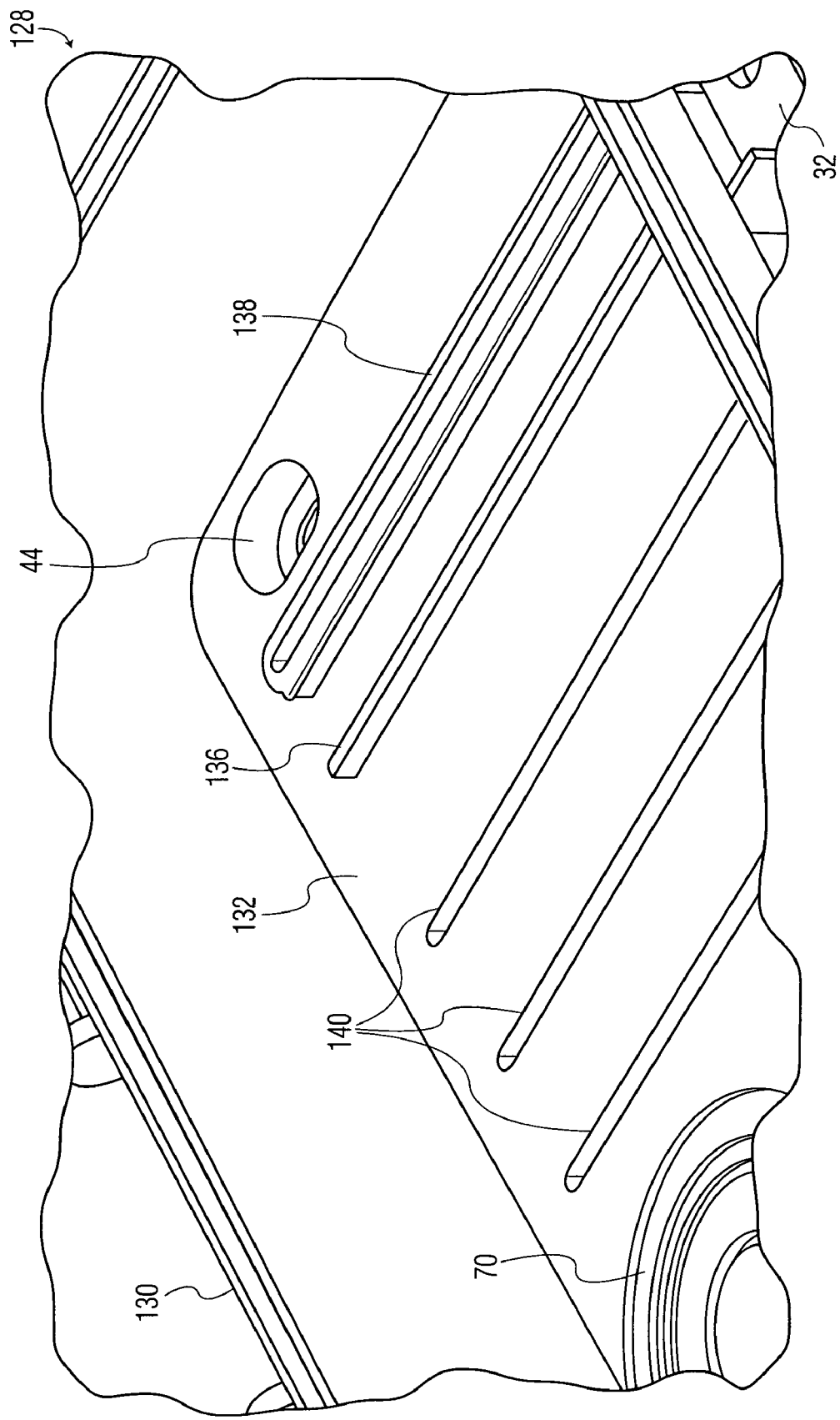
FIG. 13 is a partial perspective view of an interior bottom portion of a demarcation enclosure apparatus for another embodiment of the present invention.

Referring to FIGS. 13 and 14, a demarcation enclosure apparatus 128 is shown for another embodiment of the present invention. The apparatus 128 is similar to the previous embodiment except for the absence of a mounting deck 92. The apparatus 128 includes a mounting base portion 130 having a floor 132, first and second mounting rails 134 and 136, respectively, disposed on the floor 132, a raised mounting boss 138 located proximate to the mounting rails 134, and a plurality of flush mounting slots 140. The mounting rails 134 and 136, respectively, the raised mounting slots of the mounting boss 138 and the flush mounting slots 140 operate in the same manner as described above for similar features in the previous embodiment. As shown in FIG. 14, the communication device 22 is mounted on the raised mounting boss 138 with a threaded fastener 60 secured to the mounting bracket 62.

Although various embodiments of the invention have been shown and described, they are not meant to be limiting. Those of skill in the art may recognize various modifications to these embodiments, which modifications are meant to be covered by the spirit and scope of the appended claims. For example, the floor 40 with mounting slots 58, and/or mounting deck 92 can be configured to be rigidly mounted on a wall or a sheet of material. As a result, the various embodiments of the invention can be utilized without requiring an enclosure.

What is claimed is:

1. Apparatus for mounting a plurality of devices in a fixed location without requiring tools or screws, comprising:
   a mounting base portion having a width;
   a plurality of mounting tabs rigidly attached to each one of said plurality of devices, respectively;
   at least one pair of opposing and spaced apart first and second elongated mounting rails each disposed on and co-extending lengthwise continuously along substantially the entire width of said mounting base portion;

said first and second elongated mounting rails being configured for operative cooperation with one another to securely retain at least one of said plurality of devices anywhere along the length of the first and second elongated mounting rails;

said first elongated mounting rail being rigid; and said second elongated mounting rail being resilient.

2. The apparatus of claim 1, wherein each one of said plurality of mounting tabs of said devices include means cooperative with said first and second elongated mounting rails for providing snap-in retention and snap-out removal therebetween of associated ones of said plurality of devices.

3. Apparatus for mounting a plurality of devices in a fixed location without requiring tools or screws, comprising:

a mounting base portion having a width;

a plurality of mounting tabs rigidly attached to each one of said plurality of devices, respectively;

at least one pair of opposing and spaced apart first and second elongated mounting rails each disposed on and co-extending lengthwise continuously along substantially the entire width of said mounting base portion;

said first and second elongated mounting rails being configured for operative cooperation with one another to securely retain at least one of said plurality of devices anywhere along the length of the first and second elongated mounting rails, wherein said at least one pair of first and second elongated mounting rails includes inwardly directed protrusions extending from the distal ends thereof; and each one of said plurality of mounting tabs including:

a protruding lip for securement under the protrusion of said second elongated mounting rail; and an opposing end with a notch for receiving the protrusion of said first elongated mounting rail.

4. The apparatus of claim 1, further including at least one flush mounting slot disposed in said mounting base portion between said first and second elongated mounting rails, said flush mounting slot being configured for receiving a threaded fastener.

5. The apparatus of claim 1, further including at least one raised mounting boss defining mounting slots, disposed on said mounting base portion proximate said first and second elongated mounting rails.

6. The apparatus of claim 1, further including a housing defining an interior cavity, said housing including said mounting base portion formed integral with an interior bottom thereof.

7. The apparatus of claim 6, wherein the housing includes a movable cover to permit access to the interior cavity.

8. The apparatus of claim 1, further including:

a housing defining an interior cavity having an interior bottom portion that includes at least one countersunk groove therein;

said mounting base portion includes:

top and bottom surfaces;

at least one extension projecting from the bottom surface of the mounting base portion, said extension being configured for insertion into the corresponding countersunk groove in the interior bottom portion of said interior cavity; and at least one pair of opposing first and second mounting rails disposed on the top surface of said mounting base portion, said first and second mounting rails being spaced apart and configured for operatively cooperating with one another to securely retain the mounting tab of the device therebetween.

9. The apparatus of claim 8, wherein:

the housing includes a sidewall extending along the periphery of the interior bottom portion, said sidewall including at least one pair of interior opposing notches in opposing sidewall portions proximate to the interior bottom portion; and the mounting base portion includes at least one pair of opposing protrusions extending from opposing edges thereof, said opposing protrusions being configured for insertion into the corresponding sidewall notches of the housing to rigidly secure said mounting base portion within said housing.

10. The apparatus of claim 8, further including at least one raised mounting boss defining mounting slots, disposed on said mounting base portion proximate said first and second mounting rails, said raised mounting boss being configured for receiving a threaded fastener.

11. The apparatus of claim 8, further including at least one flush mounting slot disposed in said mounting base portion between said first and second mounting rails, said flush mounting slot being configured for receiving a threaded fastener.

12. The apparatus of claim 6, further including:

at least one aperture through a sidewall of the housing, said at least one aperture being configured for passing a cable therethrough; and a grommet-forming web extending across said at least one cable aperture, said grommet-forming web being configured for permitting passage of a portion of a cable through said at least one cable aperture, and providing a weather-tight seal therebetween.

13. The apparatus of claim 12, wherein the grommet-forming web includes a plurality of centrally located intersecting slits disposed therethrough, for permitting a cable portion to be pushed from a top portion of the grommet-forming web through a vertical slit therein into said at least one cable aperture.

14. A mounting base for providing snap-in retention, and snap-out removal of devices to be mounted thereon, said mounting base comprising:

at least one pair of opposing and spaced apart first and second elongated mounting rails disposed on and co-extending continuously along a width of said mounting base, said first and second elongated mounting rails being configured for operatively cooperating with one another to securely retain anywhere along the length of the first and second elongated mounting rails a device configured to be frictionally retained therebetween;

said first elongated mounting rail being rigid; and said second elongated mounting rail being resilient.

15. A mounting tab on a device for facilitating removable mounting of said device onto an associated receiving structure, said mounting tab comprising:

a protrusion extending from said device, said protrusion having coplanar first and second opposed ends, said first and second opposed ends being configured for reversible retaining engagement at a desired location anywhere between and along continuous lengths of opposing first and second elongated mounting rails of said associated receiving structure;

said first end including a forward extending lip portion, said lip portion being configured for operative engagement with and anywhere along the first elongated mounting rail; and said second end including a notch, said notch being configured for operative engagement with and anywhere along the opposing second elongated mounting rail.

16. The mounting tab of claim 15, wherein the protrusion further comprises at least one aperture each being configured for receiving a fastener therethrough.

17. The mounting base of claim 14, wherein said pair of first and second elongated mounting rails include inwardly directed protrusions extending from the distal ends thereof.

18. The mounting base of claim 14, further including at least one flush mounting slot disposed in said mounting base between said first and second elongated mounting rails, said flush mounting slot being configured for receiving a threaded fastener.

19. The mounting base of claim 14 wherein said device includes a mounting tab for snap engagement with and retention between said first and second elongated mounting rails.

20. The mounting base of claim 19, wherein said mounting tab includes:
 a protruding lip for securement under an inwardly directed protrusion extending from a distal end of said second elongated mounting rail; and
 an opposing end with a notch for receiving an inwardly directed protrusion extending from a distal end of said first elongated mounting rail.

21. Apparatus for mounting a plurality of devices in fixed spaced apart locations, said apparatus comprising:
 at least one mounting tab being secured to each one of said plurality of devices;
 a housing having opposing sidewalls, a bottom, and a lid, the bottom of said housing being configured for receiving for mounting by their mounting tabs via either one of snap-in retention or retention via a screw fastener;
 an independent mounting deck including on a top portion at least one pair of opposing and spaced apart first and second mounting rails configured for cooperatively securely retaining therebetween the mounting tabs of at least one of said plurality of devices via snap-in retention, and further providing snap-out removal of an associated device;
 said housing further including at least one pair of interior opposing notches in opposing sidewall portions proximate its bottom portion;
 said mounting deck further including at least one pair of opposing protrusions extending from opposing edges thereof, for insertion into said opposing sidewall notches of said housing, to rigidly secure said mounting deck within said housing;
 said housing further including at least one aperture through a sidewall of the housing; and
 a grommet-forming web extending across at least one aperture, the grommet-forming web being configured for permitting passage of a portion of an electrical cable through said at least one aperture to permit a weather-tight seal, said cable being associated with at least one of said plurality of devices mounted within said housing.

* * * * *